June 13, 1944.   W. H. OLIVER, JR   2,351,282
MICROSCOPIC SLIDE
Filed April 27, 1940
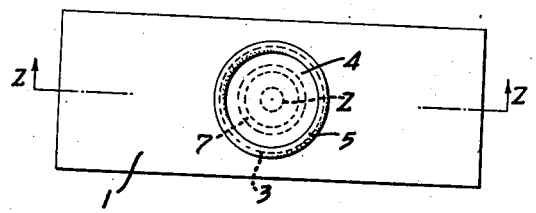
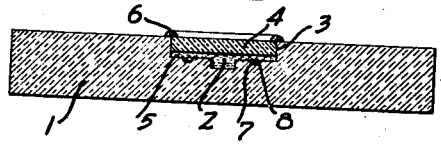
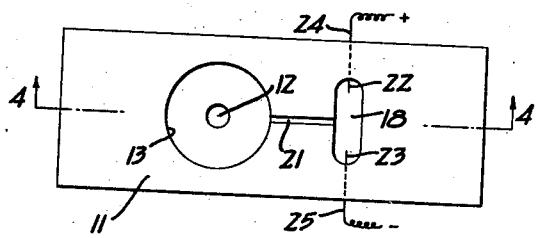
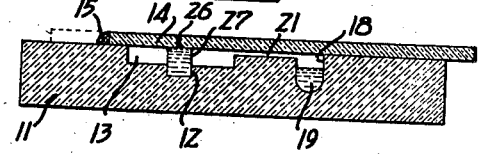
INVENTOR
WILLIAM HAROLD OLIVER JR.
BY
ATTORNEY Patented June 13, 1944

2,351,282

UNITED STATES PATENT OFFICE 2,351,282

MICROSCOPIC SLIDE

William Harold Oliver, Jr., Oakland, Calif.

Application April 27, 1940, Serial No. 332,002

1 Claim. (Cl. 88—40)

This invention relates in general to microscope slides and more specifically to a slide of this character in which an object such as a microbe or cell may be readily confined within the field and focal plane of a microscope, and supplied with oxygen and food in order to keep it alive over a relatively long period of time.

At the present time the object to be viewed is confined within a limited area on the surface of a slide by the deposition on the slide of a ring of paraffine, waterproof paper, or tin foil. The use of paraffine is objectionable, for it is difficult to apply it to the slide so as to produce a ring of predetermined depth, a requirement essential to maintain the object within the focal plane of the microscope. Rings of paper and foil are difficult to handle because of their delicate nature.

One of the objects of this invention is the provision of a slide formed with an object-receiving well of a predetermined depth and within which the object may be readily confined.

Another object of this invention is the provision of a microscope slide formed with an object-receiving well of predetermined depth and provided with a source of oxygen for sustaining the life of any living aerobic object such as a microbe or cell.

Another object of this invention is the provision of a slide into which food may be introduced for the purpose of keeping organisms alive.

The invention possesses other advantageous features, some of which with the foregoing will be set forth at length in the following description where those forms of the invention which have been selected for illustration in the drawing accompanying and forming a part of the present specification are outlined in full. In said drawing, two forms of the invention are shown, but it is to be understood that it is not limited to such form, since the invention as set forth in the claim may be embodied in a plurality of forms.

Referring to the drawing:

Figure 1 is a top plan view of a microscope slide embodying some of the objects of my invention.

Figure 2 is a section taken on the line 2—2 of Figure 1.

Figure 3 is a top plan view of a microscope slide provided with a source of oxygen and with the cover slip removed so as better to show its construction.

Figure 4 is a section taken on the line 4—4 of Figure 3 but showing the cover slip sealed in its operative position.

The structure illustrated in Figures 1 and 2 comprises a transparent thermoplastic slide 1 formed with a central object-receiving chamber 2 of predetermined depth and a countersink 3 for the reception of a glass cover slip 4. A thermoplastic material such as Lucite can be conveniently used for this purpose, for the chamber 2 and the countersink 3 can be readily formed by molding when a material of this character is used. The floor of the chamber 2 should be formed with an optical surface, and the floor of the countersink 3 should be a ground surface so that a film 5 of water or other medium can be maintained beneath the cover slip 4. For the purpose of effecting an air tight seal between the slide proper and the cover slip, a ring 6 of any non-toxic sealing compound such as Vaseline can be applied to the joint between these two members. Formed in the countersink 3 is an annular channel 7 which serves as a pocket for the reception of small particles 8 of oxygen saturated activated charcoal or other oxygen liberating material, such as unicellular blue green algae. The oxygen liberated by the charcoal or algae is in direct communication through the film 5 with the medium contained in the chamber 2, and therefore aids in sustaining the life of any aerobic organism contained therein.

Although specific dimensions play no part in this invention, it may be noted that the countersink 3 can be made with a diameter in the order of 15 mm. and a depth of .5 mm., whereas the depth of the chamber 2 below the floor of the countersink can be in the order of .015 mm. and its diameter in the order of .75 mm. The slide proper may be of standard size, 1" wide by 3" long. Obviously the smaller dimensions herein involved can not be accurately illustrated in the accompanying drawing. However, they can be readily appreciated by those skilled in the art.

The structure illustrated in Figures 3 and 4 comprises a transparent thermoplastic slide 11 provided with an object-receiving chamber 12 of predetermined depth and with a countersink 13. In this modification and in contrast to the structure shown in Figures 1 and 2, the chamber 12 and countersink 13 are covered with a cover slip 14, arranged to overlie the upper face of the slide 11. To effect an air tight seal between the slide and its cover plate, a non-toxic sealing compound 15 is disposed over the joint between these two members.

The slide 11 is provided adjacent the countersink 13 with an additional chamber or well 18 for the reception of a body 19 of an oxygengenerating electrolyte such as sodium hydroxide. Establishing communication between the well 18 and the countersink 13 is a channel 21 formed in the upper face of the slide 11 and disposed within the well 18 is a pair of electrodes 22 and 23 connected by leads 24 and 25 embedded in the slide with any suitable source of direct current.

For the purpose of introducing food into the countersink 13, the cover slip 14 is provided with a minute pinhole 26 so located that by slight lateral movement of the cover slip it can be brought into or out of registration with the countersink 13. The method used for drilling a minute pinhole of this character may be that employed by jewelers in drilling holes of like dimensions.

By means of the construction illustrated in Figures 3 and 4, a drop of the liquid medium containing the object to be viewed can be placed in the chamber 12 and by then placing the cover slip 14 over the slide, first making sure that the under side of the cover slip is absolutely clean, the medium can be supported as a column 27 between the chamber 12 and the lower face of the cover slip 14. This then exposes a relatively large area of the medium to the action of the oxygen contained within the countersink 13, liberated by the body 19 of the electrolyte contained within the well 18.

From the above description it is apparent that I have provided a microscope slide in which the object to be viewed can be readily confined within the field and focal plane of the microscope being used without resorting to the use of paraffine, paper, or metal foil rings, in which an abundant supply of oxygen may be generated for sustaining, over relatively long periods, the life of aerobic living objects, and to which food may be readily supplied.

I claim:

A microscope slide for confining a living microbe or cell within a restricted area on a predetermined plane comprising: a transparent plate formed with an object-receiving chamber defined by straight side walls and an optically flat floor not greater than one centimeter in width or length, and with a countersink over said chamber for the reception of a cover slip, said countersink being formed with a pocket adjacent said object-receiving chamber for the reception of an oxygen liberating agent so that oxygen generated in said pocket can pass between the floor of said countersink and said cover slip into said object-receiving chamber.

WILLIAM HAROLD OLIVER, Jr.